(12) United States Patent
Chen et al.

(10) Patent No.: US 11,003,216 B2
(45) Date of Patent: May 11, 2021

(54) FOLDABLE FLEXIBLE DISPLAY DEVICE

(71) Applicant: WuHan TianMa Micro-electronics CO., LTD, Wuhan (CN)

(72) Inventors: Jiang Chen, Wuhan (CN); Fang Wan, Wuhan (CN)

(73) Assignee: WuHan TianMa Micro-electronics CO., LTD, Wuhan (CN)

( * ) Notice: Subject to any disclaimer, the term of this patent is extended or adjusted under 35 U.S.C. 154(b) by 0 days.

(21) Appl. No.: 16/726,028

(22) Filed: Dec. 23, 2019

(65) Prior Publication Data

US 2021/0004054 A1 Jan. 7, 2021

(30) Foreign Application Priority Data

Jul. 1, 2019 (CN) .......................... 201910585153.X

(51) Int. Cl.
*G06F 1/16* (2006.01)
*G06F 1/18* (2006.01)

(52) U.S. Cl.
CPC .......... *G06F 1/1641* (2013.01); *G06F 1/1616* (2013.01); *G06F 1/182* (2013.01)

(58) Field of Classification Search
CPC ....... G06F 1/1641; G06F 1/1616; G06F 1/182
See application file for complete search history.

(56) References Cited

U.S. PATENT DOCUMENTS

| 2008/0110067 | A1* | 5/2008 | Smith | ................. | G09F 13/00 |
| | | | | | 40/541 |
| 2011/0193829 | A1* | 8/2011 | Tsai | ....................... | G09F 9/30 |
| | | | | | 345/204 |
| 2016/0250992 | A1* | 9/2016 | Bogenrieder | ......... | B60R 21/231 |
| | | | | | 280/729 |
| 2016/0323966 | A1* | 11/2016 | Hamel | .................. | H05B 33/26 |
| 2017/0006716 | A1* | 1/2017 | Hirakata | ............... | G06F 1/1616 |
| 2017/0186132 | A1* | 6/2017 | Lee | ......................... | G06F 1/1652 |
| 2018/0116061 | A1* | 4/2018 | Xu | ............................ | G09F 9/301 |
| 2018/0228036 | A1* | 8/2018 | Mou | ..................... | H05K 5/0217 |
| 2018/0339625 | A1* | 11/2018 | Uno | ........................ | B60N 2/90 |
| 2018/0364764 | A1* | 12/2018 | Lin | ....................... | G06F 1/1616 |

FOREIGN PATENT DOCUMENTS

| CN | 105518567 A | 4/2016 |
| CN | 205264275 U | 5/2016 |

OTHER PUBLICATIONS

First Chinese Office Action, dated Nov. 4, 2020, issued in corresponding Chinese Application No. 201910585153.X, filed Jul. 1, 2019, 17 pages.

* cited by examiner

*Primary Examiner* — Hong Zhou
(74) *Attorney, Agent, or Firm* — Christensen O'Connor Johnson Kindness PLLC

(57) ABSTRACT

A foldable flexible display device is provided. The display device includes a flexible display screen including a plurality of display sub-portions and supporting airbags. Every two adjacent supporting airbags have a folding axis therebetween. A non-light-exiting surface of each display sub-portion is provided with a supporting airbag. A switching valve is provided between two adjacent supporting airbags, and at least one supporting airbag is connected to an inflating device. When the flexible display screen is in a completely unfolded state, the switching valve is opened in such a manner that the inflating device inflates the supporting airbag.

15 Claims, 7 Drawing Sheets

FOLDABLE FLEXIBLE DISPLAY DEVICE

CROSS-REFERENCE TO RELATED APPLICATIONS

The present application claims priority to Chinese Patent Application No. 201910585153.X, filed on Jul. 1, 2019, the content of which is incorporated herein by reference in its entirety.

TECHNICAL FIELD

The present disclosure relates to the field of flexible display technology, and particularly, to a foldable flexible display device.

BACKGROUND

In the related art, smart watches, mobile phones, and tablets are classified separately in accordance with screen sizes. Smart watches are portable, but merely have some simple functions due to small display area. Mobile phones and tablets in the related art are inconvenient to carry, and cannot simultaneously meet the multi-scenario and multi-function needs of the user and the portable performance. Most wearable devices in the related art are limited to combine only smart watches and mobile phones, and there is no product that combines watches, mobile phones and tablets. On the other hand, with the continuous development of flexible panel screen technology, flexible display screens are increasingly used in various terminals. However, the flexible display screen suffers from a flatness problem when being unfolded. Accordingly, improved foldable flexible display devices are needed.

SUMMARY

In view of the above, embodiments of the present disclosure provide a foldable flexible display device.

Embodiments of the present disclosure provide a flexible display screen. The flexible display screen includes a plurality of display sub-portions, wherein every two adjacent ones of the plurality of display sub-portions have a folding axis therebetween; a plurality of supporting airbags, wherein a non-light-exiting surface of each of the plurality of display sub-portions is provided with one of the plurality of supporting airbags; and a switching valve provided between every two adjacent ones of the plurality of supporting airbags. And at least one of the plurality of supporting airbags is connected to an inflating device. When the flexible display screen is in a completely unfolded state, the switching valve is opened in such a manner that the inflating device inflates each of the plurality of supporting airbags.

BRIEF DESCRIPTION OF DRAWINGS

In order to illustrate technical solutions of embodiments of the present disclosure, the accompanying drawings used in the embodiments are introduced hereinafter. These drawings illustrate some embodiments of the present disclosure. Based on these drawings, those skilled in the art can also obtain other drawings.

DESCRIPTION OF EMBODIMENTS

In order to better understand technical solutions of the present disclosure, the embodiments of the present disclosure are described in details with reference to the drawings.

It should be clear that the described embodiments are merely part of the embodiments of the present disclosure rather than all embodiments. All other embodiments obtained by those skilled in the art shall fall into the protection scope of the present disclosure.

Figure 1A:
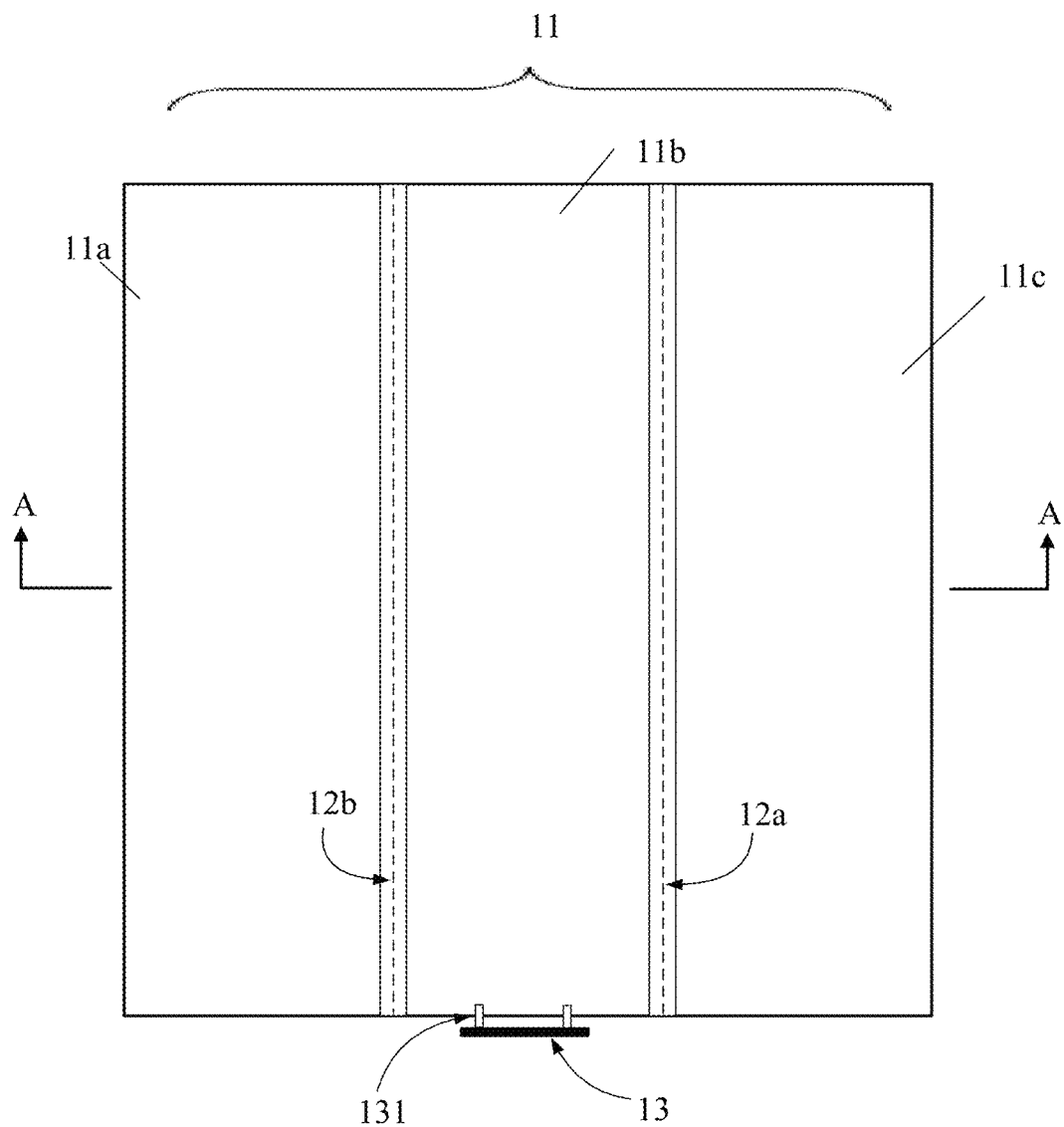
FIG. 1A is a schematic diagram of a foldable flexible display device according to some embodiments of the present disclosure.
Figure 1B:
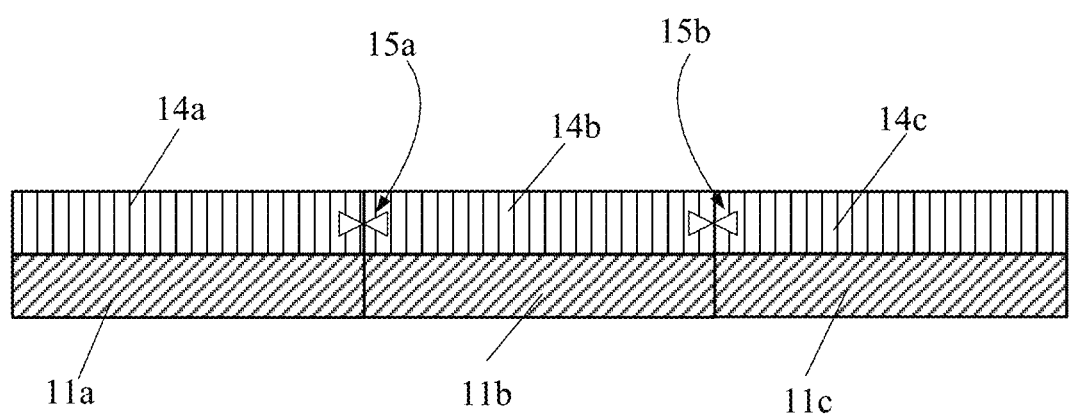
FIG. 1B is a sectional view of the foldable flexible display device taken along line A-A in FIG. 1A.

FIG. 1A is a schematic diagram of a foldable flexible display device according to some embodiments of the present disclosure. FIG. 1B is a sectional view of the foldable flexible display device taken along line A-A in FIG. 1A.

As shown in FIG. 1A, a foldable flexible display device includes a flexible display screen 11, and the flexible display screen 11 includes multiple display sub-portions. For example, the flexible display screen 11 shown in FIG. 1A and FIG. 1B includes three display sub-portions, i.e., a display sub-portion 11a, a display sub-portion 11b, and a display sub-portion 11c. The display sub-portion 11a, the display sub-portion 11b, and the display sub-portion 11c can have same shape and size. In an embodiment, an area of the display sub-portion 11b is greater than each of an area of the display sub-portion 11a and an area of the display sub-portion 11c, while the area of the display sub-portion 11a is equal to the area of the display sub-portion 11c. Each of the display sub-portion 11a, the display sub-portion 11b and the display sub-portion 11c can independently display a complete image. In an embodiment, when the flexible display screen 11 is in a semi-folded state or in a completely unfolded state, the three display sub-portions or two adjacent display sub-portions in a same plane collectively display a complete image.

Every two adjacent display sub-portions have a folding axis therebetween. For example, as shown in FIG. 1A and FIG. 1B, a folding axis 12a is provided between the display sub-portion 11b and the display sub-portion 11c, and the display sub-portion 11a and the display sub-portion 11b have a folding axis 12b therebetween. With folding axis of different structures, the flexible display screen 11 can be folded outward or inward with respect to the folding axis 12a and/or the folding axis 12b.

Referring to FIG. 1A and FIG. 1B, a non-light-exiting surface of each display sub-portion (that is, a surface opposite to a light-exiting surface of the display sub-portion of the flexible display device) is provided with a supporting airbag, and a switching valve is provided between two adjacent supporting airbags. The supporting airbags are in one-to-one correspondence with the display sub-portions. A surface of the supporting airbags that is in contact with the non-light-exiting surface of the display sub-portion and the supporting airbag is fixed by tape or glue. For example, as shown in FIG. 1B, a supporting airbag 14a is arranged on the non-light-exiting surface of the display sub-portion 11a, a supporting airbag 14b is arranged on the non-light-exiting surface of the display sub-portion 11b, and a supporting airbag 14c is arranged on the non-light-exiting surface of the display sub-portion 11c. A switching valve 15a is provided between the supporting airbag 14a and the supporting airbag 14b, and a switching valve 15b is provided between the supporting airbag 14b and the supporting airbag 14c.

In the present embodiment, at least one supporting airbag is connected to an inflating device. For example, as shown in FIG. 1A, the supporting airbag 14b disposed on the non-light-exiting surface of the display sub-portion 11b is connected to an inflating device 13, and the inflating device 13 includes an airbag valve 131. When the airbag valve 131 is opened, the inflating device 13 is configured to inflate the supporting airbag 14b. When the airbag valve 131 is closed, the inflating device 13 stops inflating the supporting airbag 14b. In an embodiment, the supporting airbag completely covers the non-light-exiting surface of the display sub-portion, such that when the supporting airbag is in the inflated state, the supporting airbag can support the display sub-portion. For example, after being inflated by the inflating device 13, the supporting airbag 14b is in the inflated state and can support the display sub-portion 11b to ensure a flatness of the display sub-portion lib. The supporting airbag can be adhered to the non-light-exiting surface of the display sub-portion through glue or tape.

FIG. 1A and FIG. 1B illustrate the flexible display device in a completely unfolded state. In the completely unfolded state, the switching valve 15a located between the supporting airbag 14a and the supporting airbag 14b and the switching valve 15b located between the supporting airbag 14b and the supporting airbag 14c are both in an opened state. The airbag valve 131 of the inflating device 13 that is connected to the supporting airbag 14b is also in the opened state, such that the three supporting airbags communicate with each other. In this way, the inflating device 13 can inflate all supporting airbags including the supporting airbag 14a, the supporting airbag 14b and the supporting airbag 14c.

Each of the supporting airbags (including the supporting airbag 14a, the supporting airbag 14b and the supporting airbag 14c) has an exhaust port (not shown). When the inflating device 13 inflates the supporting airbag 14a, the supporting airbag 14b and the supporting airbag 14c, the exhaust ports of the supporting airbag 14a, the supporting airbag 14b and the supporting airbag 14c are all closed. When it is necessary to fold the display sub-portion of the flexible display screen along the folding axis, the exhaust port of the supporting airbag on the non-light-exiting surface of the display sub-portion that needs to be folded is opened firstly to discharge air in the supporting airbag, and then the display sub-portion is folded. In practical applications, each supporting airbag can be separately provided with one exhaust port (the specific position of the exhaust port is not limited herein). In an embodiment, only the supporting airbag connected to the inflating device is provided with the exhaust port. In this case, since before the inflating device inflates other supporting airbags that are not connected to the inflating device, the switching valve between the supporting airbags need to be opened to make the supporting airbags communicate with each other. Air in other supporting airbags are discharged through the exhaust port of the supporting airbag connected to the inflating device during exhausting.

It should be noted that, in the present embodiment, the flexible display devices shown in FIG. 1A and FIG. 1B each are a three-fold flexible display device, that is, the flexible display device includes three display sub-portions. In other embodiments, the flexible display screen of the flexible display device can include more than three display sub-portions. It should be understood that since the flexible display device is a foldable flexible display device, the flexible display screen of the flexible display device includes at least two display sub-portions. Therefore, the three-fold flexible display devices shown in FIG. 1A and FIG. 1B are only illustrative, and not intended to limit the present disclosure.

Figure 2A:
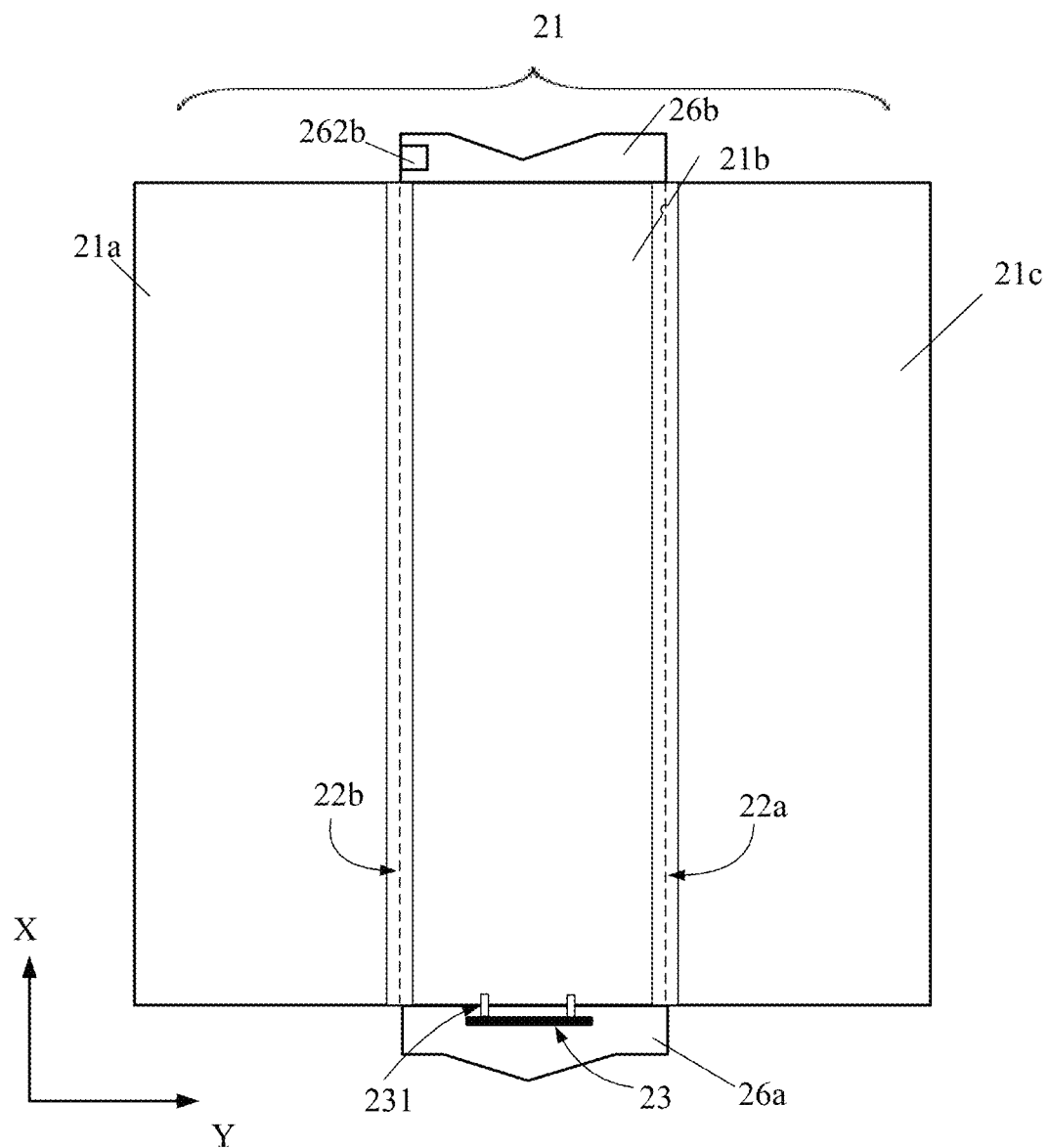
FIG. 2A is a schematic diagram of another foldable flexible display device according to some embodiments of the present disclosure.

FIG. 2A is a schematic diagram of another foldable flexible display device according to some embodiments of the present disclosure. As shown in FIG. 2A, the foldable flexible display device includes a flexible display screen 21, and the flexible display screen 21 includes three display sub-portions, which are a display sub-portion 21a, a display sub-portion 21b and a display sub-portion 21c. The display sub-portion 21b and the display sub-portion 21c have a folding axis 22a therebetween, and the display sub-portion 21a and the display sub-portion 21b have a folding axis 22b therebetween.

In this embodiment, a non-light-exiting surface of each display sub-portion is provided with a supporting airbag, and a switching valve (shown in FIG. 1B) is provided between two adjacent supporting airbags. The supporting airbag (not shown in FIG. 2A) disposed on the non-light-exiting surface of the display sub-portion 21b is connected to an inflating device 23. The inflating device 23 includes an airbag valve 231. When the airbag valve 231 is opened, the inflating device 23 is configured to inflate the supporting airbag. When the airbag valve 231 is closed, the inflating device 23 stops inflating the supporting airbag.

The difference between the flexible display device in the present embodiment and the flexible display device shown in FIG. 1A and FIG. 1B is that along an axial direction (the X direction in FIG. 2A) of the folding axis (for example, the folding axis 22a or the folding axis 22b), the display sub-portion 21b (also referred to as a first display sub-portion 21b) includes a first end provided with a first snap 26a, and a second end provided with a second snap 26b, and the first snap 26a and the second snap 26b are detachably connected to each other. The detachably connection means that the two snaps have an engaged state and a disengaged state. As shown in FIG. 2A, a shape of the first snap 26a matches with a shape of the second snap 26b, such that the first snap 26a and the second snap 26b can be engaged with each other. It should be noted that the shape of the first snap 26a and the shape of the second snap 26b in FIG. 2A are just illustrative. In practical applications, the first snap and the second snap can have other matching shapes with which the first snap and the second snap can be engaged with each other.

Figure 2B:
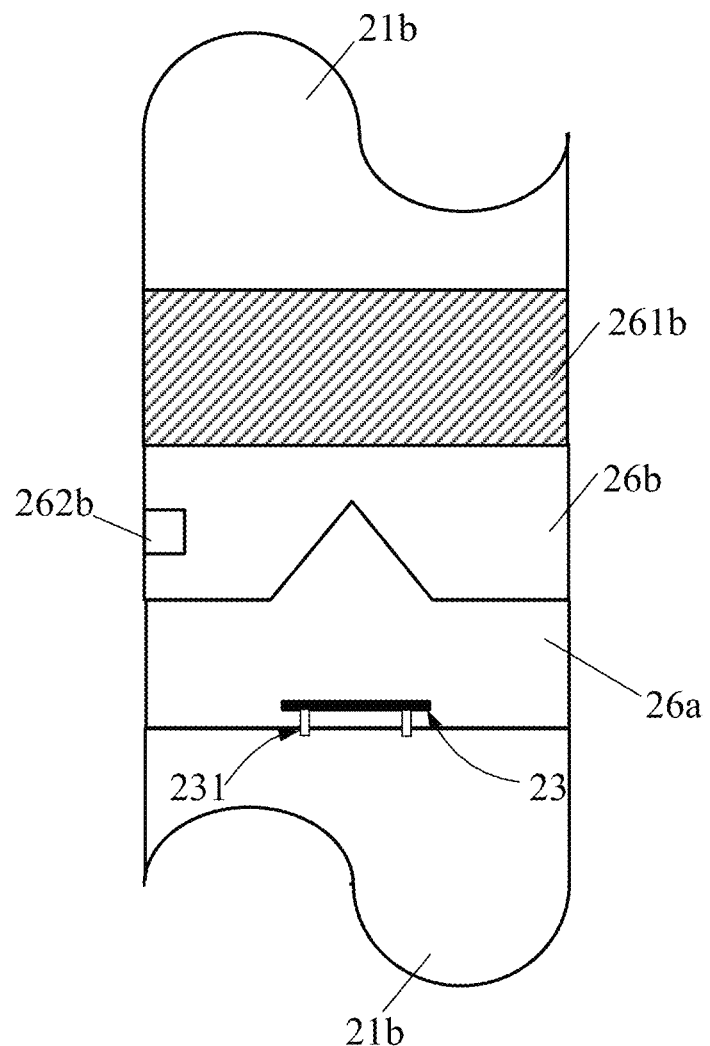
FIG. 2B is a front view showing a first snap and a second snap of the foldable flexible display device in FIG. 2A being engaged with each other.

FIG. 2B is a front view showing the first snap and the second snap of the foldable flexible display device in FIG. 2A being engaged with each other. Referring to FIG. 2B, in the present embodiment, the first snap 26a has a hollowed structure, and the inflating device 23 is arranged in the first snap 26a. The inflating device 23 includes an airbag valve 231. The second snap 26b includes a stretchable component 261b made of a stretchable material. The function of the stretchable component 261b is that in a condition where the flexible display device is in the completely folded state in which the first snap 26a is engaged with the second snap 26b (like a band), a wearer can freely adjust a stretch amount (that is, a size of the band) of the second snap 26b according to a size of his/her wrist. The stretchable material may include one or more of rubber, latex, or a magnetostriction material.

A functional component is provided on the first snap 26a or the second snap 26b. As shown in FIG. 2A and FIG. 2B, a functional component 262b is disposed in the second snap 26b. The functional component 262b includes one or more of an earpiece, a camera, or a sensor. In another embodiment, the functional component is disposed on the first snap 26a. In yet another embodiment, different functional components are arranged on the first snap 26a and the second snap 26b respectively. For example, the earpiece is disposed in the second snap 26b, and the camera is disposed in the first snap 26a.

It should be noted that, in other embodiments, the inflating device can be disposed in the second snap. In this case, the second snap has a hollowed structure and the first snap includes the stretchable component disposed therein. The first snap or the second snap can be configured in such a manner that one part has the hollowed structure (e.g., for disposing the inflating device) and another part has a structure of the stretchable component.

The first snap and the second snap can be disposed on two ends of other display sub-portion (such as the display sub-portion 21a or the display sub-portion 21c) along the axial direction of the folding axis. The shape and structure of the first snap and the second snap can be referred to FIG. 2B descried above, which is not repeated herein.

Figure 3:
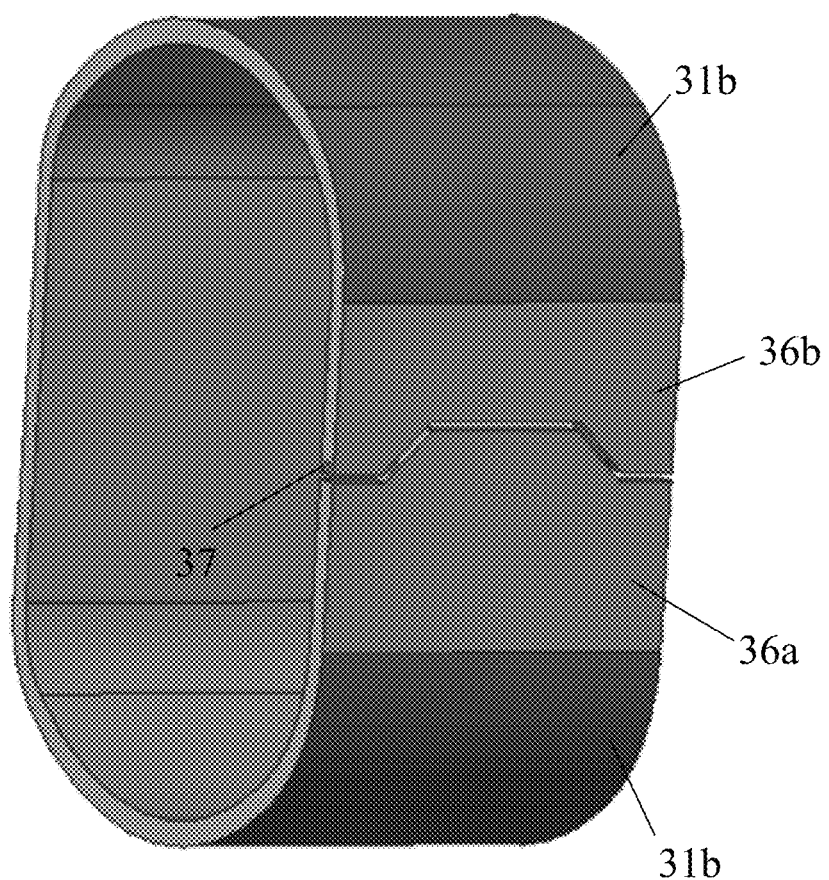
FIG. 3 is a schematic diagram of a foldable flexible display device in a completely folded state according to some embodiments of the present disclosure.

FIG. 3 is a schematic diagram of a foldable flexible display device in a completely folded state according to some embodiments of the present disclosure.

Referring to FIG. 3, when the foldable flexible display device is in the completely folded state, each supporting airbag disposed on the non-light-exiting surface of each display sub-portion of the flexible display screen is in an uninflated state. The display sub-portion whose two ends along the axial direction of the folding axis are not provided with the first snap and the second snap is in the folded state, and the display sub-portion (for example, the display sub-portion 31b in FIG. 3), whose two ends along the axial direction of the folding axis are provided with the first snap and the second snap is in a bending folded state. If the flexible display device in the completely folded state is bent to a wrist-band shape, the first snap 36a and the second snap 36b can be engaged with each other. When the flexible display device is bent to the wrist band shape, only the display sub-portion 31b can be in a screen-on state to display images, and other display sub-portions are all in a screen-off state. The user can adjust a size of the flexible display device in the wrist-band shape according to the size of his/her wrist, and make the first snap 36a and the second snap 36b be engaged with each other after wearing the flexible display device on his/her wrist. After the first snap 36a and the second snap 36b are engaged with each other, the first snap 36a and the second snap 36b can be fixed together by a metal rivet 37. The structure of the first snap 36a and the second snap 36b can be seen in the embodiment described with FIG. 2B, which is not repeated herein.

Figure 4A:
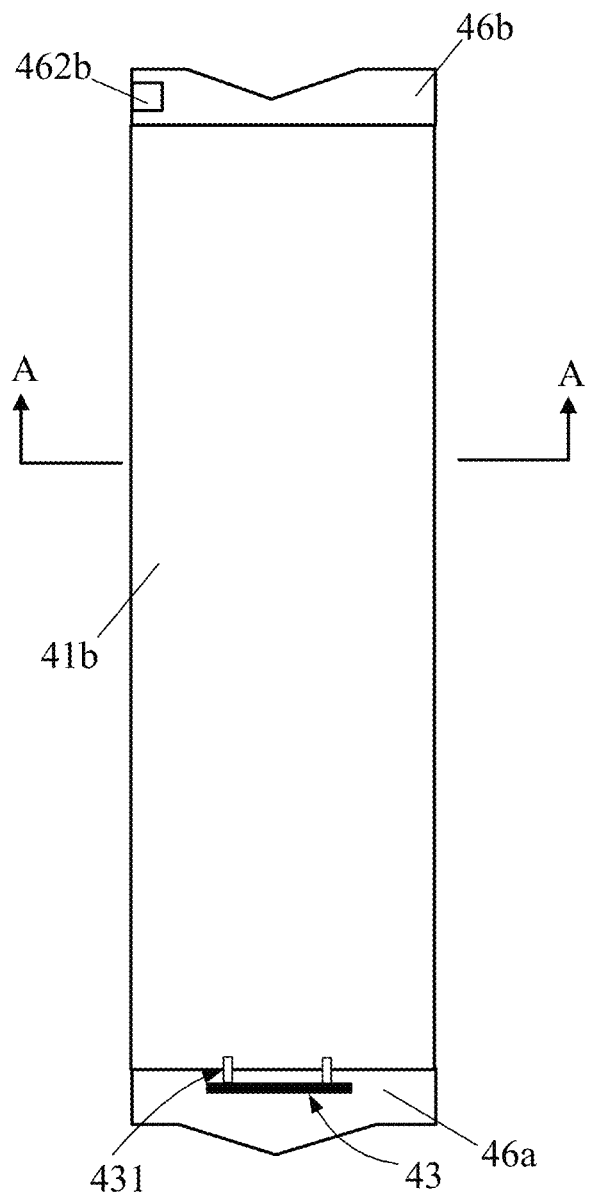
FIG. 4A is a schematic diagram of a foldable flexible display device in a semi-folded state according to some embodiments of the present disclosure.
Figure 4B:
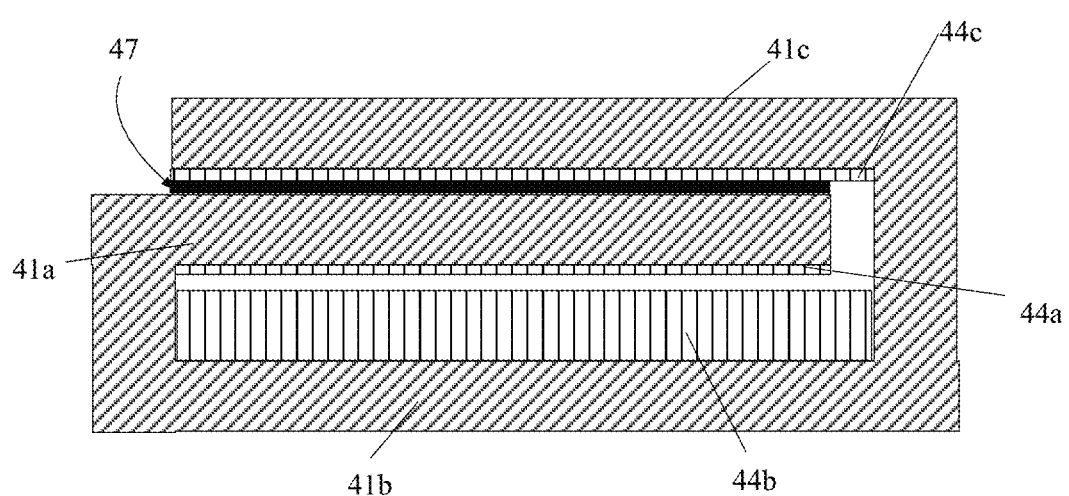
FIG. 4B is a sectional view of the foldable flexible display device taken along line A-A in FIG. 4A.

FIG. 4A is a schematic diagram of a foldable flexible display device in a semi-folded state according to some embodiments of the present disclosure. FIG. 4B is a sectional view of the foldable flexible display device taken along line A-A in FIG. 4A.

The following description is described with reference to FIG. 4A and FIG. 4B. As shown in FIG. 4B, the foldable flexible display device is a three-fold flexible display device. The flexible display screen includes three display sub-portions, which are a display sub-portion 41a, a display sub-portion 41b, and a display sub-portion 41c. Every two adjacent display sub-portions have folding axis (not shown) therebetween. In the foldable flexible display device in the semi-folded state of the present embodiment, the display sub-portion 41a (which is referred to as the second display sub-portion 41a hereafter) is folded with respect to the folding axis arranged between the display sub-portion 41a and the display sub-portion 41b, and the display sub-portion 41c (which is referred to as the third display sub-portion 41c hereafter) is folded with respect to the folding axis arranged between the display sub-portion 41c and the display sub-portion 41b. The display sub-portion 41b (which is referred to as the first display sub-portion 41b hereafter) is in the unfolded state. In the semi-folded state, only the display sub-portion 41b is in the screen-on state, and both the display sub-portion 41a and the display sub-portion 41c are in the screen-off state. The non-light-exiting surface of each display sub-portion is provided with a supporting airbag. The supporting airbag 44b (which is referred to as the first supporting airbag 44b hereafter) on the non-light-exiting surface of the display sub-portion 41b is in an inflated state, such that the flatness of the display sub-portion 41b in the unfolded state is ensured. A second supporting airbag 44a on the non-light-exiting surface of the second display sub-portion 41a and a third supporting airbag 44c on the non-light-exiting surface of the third display sub-portion 41c are both in an uninflated state.

With continued reference to FIG. 4B, in order to maintain the folded second display sub-portion 41a and the folded third display sub-portion 41c at their folding positions (that is, the positions of the second display sub-portion 41a and the third display sub-portion 41c shown in FIG. 4B), a state maintaining component (such as a state maintaining component 47 on the supporting airbag that is arranged on a non-light-exiting surface of the third display sub-portion 41c shown in FIG. 4B) is provided at one side of the second supporting airbag facing away from the flexible display screen. The state maintaining component 47 is configured to maintain the folded state of the flexible display screen. The state maintaining component may include one or more of a magnetic fixing component, an absorption fixing component, or an engagement fixing component. The magnetic fixing component can maintain a position of the folded display sub-portion by means of attraction of opposite magnetic polarities, such that the flexible display screen is kept in the folded state. The absorption fixing component can maintain the position of the folded display sub-portion by means of an adsorbent, such that the flexible display screen is kept in the folded state. The engagement fixing component can maintain the position of the folded display sub-portion by means of an engaging of two components whose shapes are matching, such that the flexible display screen is kept in the folded state.

Referring to FIG. 4A, in one or more embodiments, two ends, along the axial direction of the folding axis, of the first display sub-portion 41b are provided with a first snap 46a and a second snap 46b. The first snap 46a has a hollowed structure. An inflating device 43 is disposed in the first snap 46a. The inflating device 43 includes an airbag valve 431. A functional component 462b is provided on the second snap 46b. The functional component 462b includes one or more of an earpiece, a camera, or a sensor.

It should be noted that, in the foldable flexible display device in the semi-folded state that is shown in FIG. 4A and FIG. 4B, only the first display sub-portion 41b is in the unfolded state, the second display sub-portion 41a is folded with respect to the folding axis arranged between the second display sub-portion 41a and the first display sub-portion 41b, and the third display sub-portion 41c is folded with respect to the folding axis arranged between the third display sub-portion 41c and the first display sub-portion 41b. In actual applications, the second display sub-portion 41a or the third display sub-portion 41c can also be in the unfolded state. That is, the first display sub-portion 41b and the second display sub-portion 41a are in the unfolded state, while the third display sub-portion 41c is folded with respect to the folding axis arranged between the third display sub-portion 41c and the first display sub-portion 41b. In an embodiment, the first display sub-portion 41b and the third display sub-portion 41c are in the unfolded state, while the second display sub-portion 41a is folded with respect to the folding axis arranged between the second display sub-portion 41a and the first display sub-portion 41b. It should be understood that if the second display sub-portion 41a or the third display sub-portion 41c is in the unfolded state, the supporting airbag on the non-light-exiting surface of the second display sub-portion 41a or the supporting airbag on the non-light-exiting surface of the third display sub-portion 41c is in the inflated state, such that the flatness of the second display sub-portion 41a or the third display sub-portion 41c in the unfolded state is ensured.

To summarize, embodiments of the present disclosure provide the foldable flexible display devices. When the flexible display screen is in the completely unfolded state, each supporting airbag is in the inflated state to support a corresponding display sub-portion, and thus the flatness of the flexible display screen is improved when the flexible display screen is unfolded. The two ends, along the axial direction of the folding axis, of the display sub-portion on which the supporting airbag is connected to the inflating device, are provided with a first snap and a second snap, respectively, and the first snap and the second snap are detachably connected. When the flexible display screen is in the completely folded state, the first snap and the second snap are engaged with each other. When the flexible display screen is other states, the first snap and the second snap are disengaged with each other. The second snap includes a stretchable component made of a stretchable material, such that a stretch amount can be adjusted according to the size of the wearer' wrist.

The above only illustrates exemplary embodiments of the present disclosure and does not intend to limit the present disclosure. Any modifications, equivalent substitutions, improvements, etc., which are made within the spirit and principles of the present disclosure, should be included in the protection scope of the present disclosure.

What is claimed is:

1. A foldable flexible display device, comprising:
a flexible display screen comprising a plurality of display sub-portions, wherein every two adjacent ones of the plurality of display sub-portions have a folding axis therebetween;
a plurality of supporting airbags, wherein a non-light-exiting surface of each of the plurality of display sub-portions is provided with one of the plurality of supporting airbags; and
a switching valve provided between every two adjacent ones of the plurality of supporting airbags,
wherein at least one of the plurality of supporting airbags is connected to an inflating device, and
wherein when the flexible display screen is in a completely unfolded state, the switching valve is opened in such a manner that the inflating device inflates each of the plurality of supporting airbags;
wherein the plurality of display sub-portions comprises a first display sub-portion, a first supporting airbag of the plurality of supporting airbags is provided on a non-light-exiting surface of the first display sub-portion, and the first supporting airbag is connected to the inflating device;
wherein along an axial direction of the folding axis, the first display sub-portion has a first end provided with a first snap, and a second end provided with a second snap, and the first snap and the second snap are detachably connected to each other; and
wherein the first snap has a hollowed structure, and the inflating device is arranged in the first snap.

2. The foldable flexible display device according to claim 1, wherein the second snap comprises a stretchable component made of a stretchable material.

3. The foldable flexible display device according to claim 2, wherein the stretchable material comprises one or more of rubber, latex, or a magnetostriction material.

4. The foldable flexible display device according to claim 1, further comprising:
a functional component arranged on at least one of the first snap or the second snap, wherein the functional component comprises one or more of an earpiece, a camera, or a sensor.

5. The foldable flexible display device according to claim 1, wherein the plurality of display sub-portions further comprises a second display sub-portion, a second supporting airbag of the plurality of supporting airbags is provided on a non-light-exiting surface of the second display sub-portion, and the switching valve is provided between the first supporting airbag and the second supporting airbag; and
wherein a state maintaining component is arranged on one side of the second supporting airbag facing away from the flexible display screen, and the state maintaining component is configured to maintain a folded state of the flexible display screen.

6. The foldable flexible display device according to claim 5, wherein the state maintaining component comprises one or more of a magnetic fixing component, an absorption fixing component, or an engagement fixing component.

7. The foldable flexible display device according to claim 1, wherein at least one of the plurality of supporting airbags comprises an exhaust port.

8. A foldable flexible display device, comprising:
a flexible display screen comprising a plurality of display sub-portions, wherein every two adjacent ones of the plurality of display sub-portions have a folding axis therebetween;
a plurality of supporting airbags, wherein a non-light-exiting surface of each of the plurality of display sub-portions is provided with one of the plurality of supporting airbags; and
a switching valve provided between every two adjacent ones of the plurality of supporting airbags,
wherein at least one of the plurality of supporting airbags is connected to an inflating device,
wherein when the flexible display screen is in a completely unfolded state, the switching valve is opened in such a manner that the inflating device inflates each of the plurality of supporting airbags,
wherein the plurality of display sub-portions comprises a first display sub-portion, a first supporting airbag of the plurality of supporting airbags is provided on a nonlight-exiting surface of the first display sub-portion, and the first supporting airbag is connected to the inflating device, wherein along an axial direction of the folding axis, the first display sub-portion has a first end provided with a first snap, and a second end provided with a second snap, and the first snap and the second snap are detachably connected to each other, and wherein the foldable flexible display device has:
- a completely folded state in which the first snap and the second snap are engaged with each other and each of the plurality of supporting airbags is in an uninflated state;
- a semi-folded state in which the first snap and the second snap are disengaged with each other and at least one of the plurality of supporting airbags is in an inflated state; and
- the completely unfolded state in which the first snap and the second snap are disengaged with each other, and each of the plurality of supporting airbags is in the inflated state.

9. The foldable flexible display device according to claim 8, wherein the first snap has a hollowed structure, and the inflating device is arranged in the first snap.

10. The foldable flexible display device according to claim 8, wherein the second snap comprises a stretchable component made of a stretchable material.

11. The foldable flexible display device according to claim 10, wherein the stretchable material comprises one or more of rubber, latex, or a magnetostriction material.

12. The foldable flexible display device according to claim 8, further comprising:
a functional component arranged on at least one of the first snap or the second snap, wherein the functional component comprises one or more of an earpiece, a camera, or a sensor.

13. The foldable flexible display device according to claim 8, wherein the plurality of display sub-portions further comprises a second display sub-portion, a second supporting airbag of the plurality of supporting airbags is provided on a non-light-exiting surface of the second display sub-portion, and the switching valve is provided between the first supporting airbag and the second supporting airbag; and wherein a state maintaining component is arranged on one side of the second supporting airbag facing away from the flexible display screen, and the state maintaining component is configured to maintain a folded state of the flexible display screen.

14. The foldable flexible display device according to claim 13, wherein the state maintaining component comprises one or more of a magnetic fixing component, an absorption fixing component, or an engagement fixing component.

15. The foldable flexible display device according to claim 8, wherein at least one of the plurality of supporting airbags comprises an exhaust port.

* * * * *